United States Patent [19]

Sze

[11] 3,962,098

[45] June 8, 1976

[54] GRAVITY SETTLING

[75] Inventor: Morgan C. Sze, Upper Montclair, N.J.

[73] Assignee: The Lummus Company, Bloomfield, N.J.

[22] Filed: Sept. 13, 1974

[21] Appl. No.: 505,933

[52] U.S. Cl. .............................. 210/532 R; 210/84; 210/513; 210/540
[51] Int. Cl.² ........................................ B01D 21/02
[58] Field of Search .............. 210/83, 84, 207, 513, 210/532–536, 538, 540

[56] References Cited
UNITED STATES PATENTS

| | | | |
|---|---|---|---|
| 883,608 | 3/1908 | Antoine | 210/207 |
| 1,686,076 | 10/1928 | Evans | 210/207 |
| 2,464,617 | 3/1949 | Sebald | 210/532 R |
| 2,678,699 | 5/1954 | Fowler | 210/512 R |
| 2,860,786 | 11/1958 | Kittredge | 210/207 X |
| 3,375,930 | 4/1968 | Applebaum | 210/207 |
| 3,393,804 | 7/1968 | Miller et al. | 210/207 X |
| 3,429,442 | 2/1969 | Mackrle et al. | 210/207 X |

Primary Examiner—Charles N. Hart
Assistant Examiner—Robert G. Mukai
Attorney, Agent, or Firm—Marn & Jangarathis

[57] ABSTRACT

Gravity settler comprised of a conical vessel positioned in the lower portion and surrounded by an ellipsoidal (preferably a sphere) housing whereby the settler has a spherically shaped upper portion and conically shaped lower portion. The settler is particularly suited for separating solids from a coal liquefaction product.

4 Claims, 1 Drawing Figure

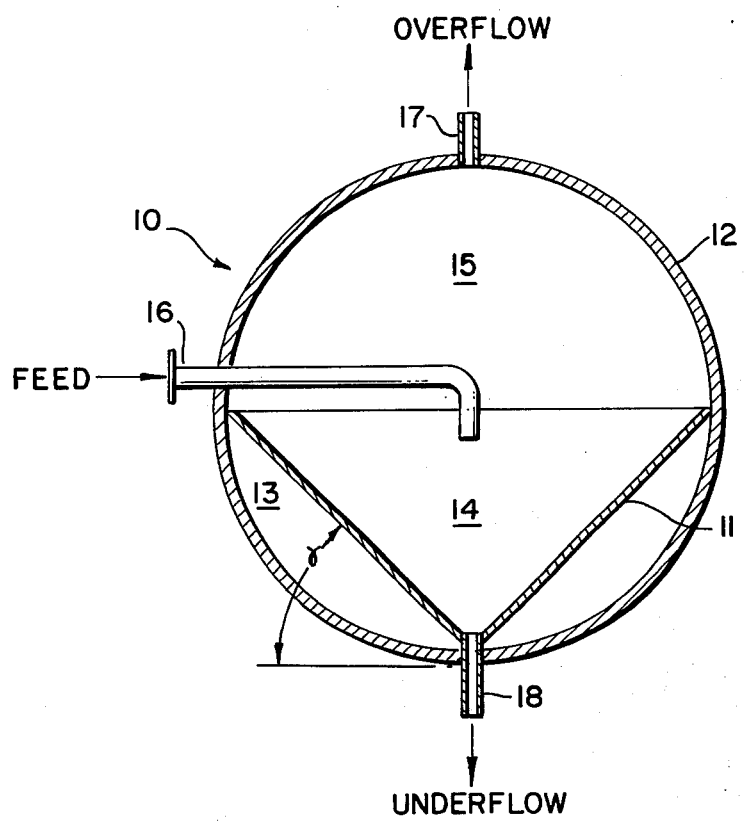

GRAVITY SETTLING

This invention relates to liquid-solid separation, and more particularly to liquid-solid separation by gravity separation. Still more particularly, this invention relates to a new and improved process and apparatus for separating solids from a coal liquefaction product.

In many processes, there is a need for efficiently effecting liquid-solid separation by gravity settling. Thus, for example, in the liquefaction of coal, the coal liquefaction product includes a mixture of coal extract and undissolved coal residue, including undissolved extractable carbonaceous matter, fusain and mineral matter or ash. The finely divided undissolved coal residue must be separated from the coal extract, and the difficulties encountered in such a separation has been the principal drawback to the successful commerical operation of a coal extraction process. Recently, there has been proposed a process for effecting such separation by gravity settling, and in many cases, it is preferred to effect such gravity settling at an elevated pressure.

Accordingly, there is a need for improved apparatus for effecting liquid-solid separation by gravity settling which is capable of being operated at elevated pressures.

An object of the present invention is to provide an improved apparatus for effecting liquid-solid separation.

Another object of the present invention is to provide a new and improved gravity settler.

A further object of the present invention is to provide for separation of insoluble material from a coal liquefaction product by gravity settling.

These and other objects of the present invention should become apparent from reading the following description thereof.

In accordance with the present invention, there is provided a gravity settler comprised of a conically shaped vessel mounted in the lower interior of and enclosed by an ellipsoidal housing to define a gravity settler with a conically shaped lower interior portion and an ellipsoidally shaped upper interior portion. It is to be understood that the term "ellipsoid" is used generically and includes a spherical housing, with the spherical housing being preferred. The gravity settler is provided with suitable inlet means for introducing a solids-liquid mixture into the gravity settler and suitable outlet means for withdrawing from the gravity settler an essentially solids free liquid and a flowable solid containing stream.

In accordance with a preferred aspect of the present invention, a coal liquefaction product, comprised of a liquid coal extract of dissolved carbonaceous matter in a coal liquefaction solvent and insoluble material (ash and unreacted coal), preferably in admixture with a liquid promoter, as hereinafter described, is introduced into a gravity settler of the type hereinabove described; i.e., a conical vessel mounted within and enclosed by an ellipsoidal housing, to recover, as an overflow stream, a coal extract essentially free of solids, and an underflow stream containing the insoluble material.

The liquid promoter which is employed to enhance and promote the separation of insoluble material from the coal liquefaction product is generally a hydrocarbon liquid having a characterization factor (K) of at least about 9.75 and preferably at least about 11.0 wherein:

$$K = \sqrt[3]{\frac{T_B}{G}}$$

wherein $T_B$ is the molal average boiling point of the liquid (°R); and G is specific gravity of the liquid (60°F/60°F).

The characterization factor is an index of the aromaticity/parafinicity of hydrocarbons and petroleum fractions as disclosed by Watson and Nelson, Ind. Eng. Chem. 25,880 (1933), with more parafinic materials having higher values for the characterization factor (K). The promoter liquid which is employed is one which has a characterization factor (K) in excess of 9.75 and which is also less aromatic than the liquefaction solvent; i.e., the characterization factor K of the promoter liquid has a value which is generally at least 0.25 higher than the characterization factor of the liquefaction solvent.

The liquid which is used to enhance and promote the separation of insoluble material is further characterized by a 5 volume percent distillation temperature of at least about 250°F and a 95 volume percent distillation temperature of at least about 350°F and no greater than about 750°F. The promoter liquid preferably has a 5 volume percent distillation temperature of at least about 310°F and most preferably of at least about 400°F. The 95 volume percent distillation temperature is preferably no greater than about 600°F. The most preferred promoter liquid has a 95 volume percent distillation temperature of no greater than about 500°F. It is to be understood that the promoter liquid may be a hydrocarbon; e.g., tetrahydronaphthalene, in which case the 5 volume percent and 95 volume percent distillation temperatures are the same; i.e., the hydrocarbon has a single boiling point. In such a case, the boiling point of the hydrocarbon must be at least about 350°F in order to meet the requirements of a 5 volume percent distillation temperature of at least about 250°F and a 95 volume percent distillation temperature of at least about 350°F. The promoter liquid is preferably a blend mixture of hydrocarbons in which case the 5 volume percent and 95 volume percent distillation temperatures are not the same.

The 5 volume and 95 volume percent distillation temperature may be conveniently determined by ASTM No. D 86-67 or No. D 1160 with the former being preferred for those liquids having a 95% volume distillation temperature below 600°F. The methods for determining such temperatures are well known in the art and further details in this respect are not required for a full understanding of the invention. It is also to be understood that the reported temperatures are corrected to atmospheric pressure.

As representative examples of such liquids, there may be mentioned: kerosene or kerosene fractions from paraffinic or mixed base crude oils; middle distillates, light gas oils and gas oil fractions from paraffinic or mixed based crude oils; alkyl benzenes with side chains containing ten or more carbon atoms; paraffinic hydrocarbons containing more than 12 carbon atoms; white oils or white oil fractions derived from crude oils; alphaolefins containing more than 12 carbon atoms; fully hydrogenated naphthalenes and substituted naphthalenes; propylene oligomers (pentamer and higher); tetrahydronaphthalene, heavy naphtha fractions, etc. The most preferred liquids are kerosene fractions;

white oils; fully hydrogenated naphthalenes and substituted naphthalenes; and tetrahydronaphthalene.

The amount of liquid promoter used for enhancing and promoting the separation of insoluble matter from the coal liquefaction product will vary with the particular liquid employed, the coal liquefaction solvent, the coal used as starting material and the manner in which the liquefaction is effected. As should be apparent to those skilled in the art, the amount of liquid promoter used should be minimized in order to reduce the overall costs of the process. It has been found that by using the liquid of controlled aromaticity, in accordance with the teachings of the present invention, the desired separation of insoluble material may be effected with modest amounts of liquid promoter. In general, the weight ratio of liquid promoter to coal solution may range from about 0.2:1 to about 3.0:1, preferably from about 0.3:1 to about 2.0:1 and, most preferably from about 0.3:1 to about 1.5:1. In using the preferred promoter liquid which is kerosene fraction having 5% and 95% volume distillation temperatures of 425°, and 500°F, respectively, promoter liquid to coal solution weight ratios in the order of 0.4:1 to 0.6:1 have been particularly successful. It is to be understood, however, that greater amounts of liquid promoter may be employed but the use of such greater amounts is uneconomical. In addition, the use of an excess of liquid promoter may result in the precipitation or separation of an excessive amount of desired coal derived products from the coal extract. More particularly, as the amount of liquid promoter employed is increased, a greater amount of ash is separated from the coal solution, but such increased ash separation is accompanied by an increased separation of desired coal derived products from the coal solution. By using the liquid promoters as herein described, not only may modest amounts of solvent be employed, but, in addition, ash may be effectively separated from the coal solution; e.g., in amounts greater than 90%, without an excessive loss of desired coal derived products.

In addition, the net coal product (the extracted carbonaceous matter, excluding promoter liquid, liquefaction solvent and gas make), hereinafter sometimes referred to as "coal product," contains less than about 0.5% insoluble material, all by weight. The specific amount of insoluble material which is permitted to be present in the coal product is dependent upon the product standards, and the deashing is controlled in order to provide the required specifications. Based on an Illinois type coal, the production of a coal product having less than 0.05%, by weight, insoluble material, corresponds to 99.8+% ash removal; however, as should be apparent, the percent ash removal required to provide a coal product having the required minimum amount of insoluble material is dependent upon the initial ash content of the coal. Thus, the liquid promoter is added to the coal solution in an amount, as herein above described, to provide a coal product in which insoluble material is present in an amount of less than about 0.05%, by weight.

The liquid promoter may also be prepared by blending a material having a characterization factor below 9.75 with a material having a characterization factor above 9.75, provided the blend has a characterization factor above 9.75 and the boiling properties, as hereinabove described. The use of blended materials is a convenient manner of regulating the characterization factor.

The use of a liquid promoter for enhancing separation of insoluble material from a coal liquefaction product is described in detail in U.S. Application Ser. No. 304,319, filed on Nov. 7, 1972, and hereby incorporated by reference.

The gravity settling is generally effected at a temperature from 300° to about 600°F, preferably from 350° to 550°F, and at a pressure from about 0 psig preferably at least 30 psig, and up to about 500 psig, preferably at a pressure from about 30 psig to 150 psig. It is to be understood that higher pressures could be employed, but in general lower pressures are preferred.

In effecting the separation of insoluble material from a coal liquefaction product by gravity settling in accordance with the present invention, in general, the upflow velocity of the essentially solid free coal extract is in the order of about 0.75 to 2.0 ft/hr, preferably 1.25 to 1.50 ft/hr, based on the maximum cross sectional area. In addition, the wall of the conical vessel is sloped with respect to horizontal at an angle of at least 45° and less than 90°, preferably in the order of 55° to 70°.

The invention will be further described with respect to an embodiment thereof illustrated in the accompanying drawing wherein:

The drawing illustrates an embodiment of the gravity settler of the present invention.

Referring to the drawing, there is shown a gravity settler 10 comprised of a conically shaped vessel 11 within and enclosed by an ellipsoidal housing 12, with the ellipsoid being particularly shown in the preferred spherical form. The conical vessel 11 is positioned in the lower portion of the spherical housing 12, with the maximum cross sectional dimension of the conical vessel 11, i.e., the top thereof, being positioned within the spherical housing 12 at its maximum cross sectional dimension; i.e., the circular base of the conical vessel is horizontally positioned in a plane through the center of the spherical housing 12, in order to maximize the inlet settling area. The conical vessel 11 is suitably attached, at its top, to the spherical housing 12. Accordingly, the gravity settler 10 is comprised of a conically shaped lower interior portion 14 and a spherically shaped under interior portion 15. As hereinabove described, the wall of the conically shaped vessel is sloped with respect to horizontal at an angle and of at least 45° and less than 90°. It is to be understood that the conical vessel 11 could have an elliptically shaped base instead of a circular base, with an elliptic base being preferred when the ellipsoidal housing is other than a sphere.

The gravity settler 10 is provided with inlet means for introducing a liquid-solid feed into the center of the top portion of the conically shaped vessel, in the form of inlet pipe 16. The inlet means introduces the feed at an intermediate portion of the gravity settler in the area of the maximum cross section thereof, preferably in the conically shaped portion of the vessel. The settler 10 is further provided with outlet means for withdrawing essentially solid free overflow from the top portion of the spherically shaped upper interior portion 15 of the gravity settler 10 in the form of outlet pipe 17, and outlet means for withdrawing solid containing underflow from the bottom portion of the conically shaped lower interior portion 14 of the gravity settler 10 in the form of outlet pipe 18. Although the outlet pipe 17 is particularly shown and described as being at the top of the gravity settler, it is to be understood that the means for withdrawing overflow from the top portion of the vessel could be comprised of an outlet pipe in fluid flow communication with a lower interior compartment 13 formed between the conical vessel 11 and housing 12 and appropriate internal piping for passing essentially solid free overflow from the top of the settler 10 into the compartment 13. It is to be understood that in any event the pressure in spaces 13 and 15 are balanced.

As hereinabove described, the gravity settler 10 is particularly adapted for separating insoluble material from a coal liquefaction product. In accordance with such a preferred procedure, a coal liquefaction product, comprised of coal extract and insoluble material, in admixture with a liquid promoter, as hereinabove described, is introduced into gravity settler 10 through feed pipe 16 to effect separation of the insoluble material. An essentially solids free overflow of coal extract is withdrawn from settler 10 through outlet pipe 17 and a solids containing underflow is withdrawn from settler 10 through pipe 18.

Although the hereinabove described embodiment in which the housing is in the shape of a sphere is preferred, it is to be understood that an ellipsoidal housing other than a sphere can be used. Similarly, the base of the conical vessel may be positioned within the housing at a point other than at the maximum cross section of the housing. Furthermore, the feed may be introduced into the conical vessel other than at the center; i.e., along its axis, thereof.

The present invention is particularly advantageous in that there is provided a gravity settling apparatus which is capable of being operated at an elevated pressure and which can be easily designed and constructed to meet existing codes for pressure vessels. The settler is particularly suited for separating solids from a coal extract and is generally constructed with diameters in the order of 112 feet.

Numerous modifications and variations of the present invention are possible in light of the above teachings; therefore, within the scope of the appended claims the invention may be practiced otherwise than as particularly described.

What is claimed is:

1. A gravity settler for separating solids from a coal liquefaction product at an elevated pressure, comprising:
    an ellipsoidally shaped housing;
    a conically shaped vessel positioned in the lower portion of the ellipsoidally shaped housing and surrounded thereby to define a gravity settling vessel having a conically shaped lower interior portion and a frusto-ellipsoidally shaped upper portion, said conically shaped vessel being sloped with respect to horizontal at an angle of at least 45° and less than 70°;
    inlet means for downwardly introducing solids and liquid into an intermediate axial portion of the conically shaped vessel in the area of maximum cross-section;
    first outlet means for withdrawing essentially solids free overflow from substantially the uppermost portion of the upper frust o-ellipsoidally shaped interior portion of the gravity settler; and
    second outlet means for withdrawing solids containing underflow from the lower conically shaped interior portion of the gravity settler.

2. The gravity settler of claim 1 wherein the ellipsoidally shaped housing is in the form of a sphere.

3. The gravity settler of claim 2 wherein the base of the conical vessel is positioned in a horizontal plane through the center of the spherical housing.

4. The gravity settler of claim 3 wherein the wall of the conically shaped vessel is sloped with respect to horizontal at an angle from 55° to 70°.

* * * * *

UNITED STATES PATENT OFFICE
CERTIFICATE OF CORRECTION

Patent No. 3,962,098           Dated June 8, 1976

Inventor(s)    MORGAN C. SZE

It is certified that error appears in the above-identified patent and that said Letters Patent are hereby corrected as shown below:

In the Specification, column 2, line 1 the formula of (K) should read as follows:

$$K = \frac{\sqrt[3]{T_B}}{G}$$

Signed and Sealed this

Thirtieth Day of December 1980

[SEAL]

Attest:

SIDNEY A. DIAMOND

Attesting Officer      Commissioner of Patents and Trademarks